(12) United States Patent
Tassy et al.

(10) Patent No.: US 10,562,447 B2
(45) Date of Patent: Feb. 18, 2020

(54) INTERIOR LIGHTING MODULE FOR A MOTOR VEHICLE

(71) Applicant: VALEO VISION, Bobigny (FR)

(72) Inventors: Pierre-Louis Tassy, Bobigny (FR);
Jingjing Xue, Bobigny (FR); Martin Trebes, Bad Rodach (DE); Peter Haebler, Bad Rodach (DE)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 15/941,254

(22) Filed: Mar. 30, 2018

(65) Prior Publication Data

US 2018/0281675 A1 Oct. 4, 2018

(30) Foreign Application Priority Data

Mar. 31, 2017 (FR) ..................................... 17 52770

(51) Int. Cl.
*B60Q 3/74* (2017.01)
*B60Q 3/64* (2017.01)
*B60Q 3/51* (2017.01)
*B60Q 3/12* (2017.01)

(52) U.S. Cl.
CPC ................ *B60Q 3/74* (2017.02); *B60Q 3/51* (2017.02); *B60Q 3/64* (2017.02); *B60Q 3/12* (2017.02)

(58) Field of Classification Search
CPC ... B60Q 3/74; B60Q 3/51; B60Q 3/64; B60Q 3/12; F21W 2106/00; F21S 43/31; F21S 43/14; F21S 43/19
See application file for complete search history.

(56) References Cited

U.S. PATENT DOCUMENTS

| 8,398,283 B2 * | 3/2013 | Lambert | G02B 6/0096 |
| | | | 362/511 |
| 2003/0043590 A1 | 3/2003 | Walser et al. | |
| 2005/0036328 A1 | 2/2005 | Walser et al. | |

(Continued)

FOREIGN PATENT DOCUMENTS

| DE | 298 11 417 U1 | 10/1998 |
| DE | 602 23 050 T2 | 7/2008 |

(Continued)

OTHER PUBLICATIONS

FR1752770, Isr.pdf, Mar. 2017.*

(Continued)

*Primary Examiner* — Tracie Y Green
(74) *Attorney, Agent, or Firm* — Oblon, McClelland, Maier & Neustadt, L.L.P.

(57) ABSTRACT

An interior lighting module for a motor vehicle interior, the lighting module including at least two light sources, each light source being associated with an optical guide in order to make at least two distinct light beams. The lighting module thus makes it possible to produce at least two light functions, preferentially distinct from one another. According to the invention, the light sources of the lighting module are secured to one and the same planar substrate in order to facilitate the incorporation thereof in the interior of the motor vehicle and to facilitate the establishing of the electrical connections with the electrical circuit of the interior and also relates to a motor vehicle interior including such an interior lighting module.

20 Claims, 2 Drawing Sheets

(56) References Cited

U.S. PATENT DOCUMENTS

| | | | |
|---|---|---|---|
| 2007/0019429 A1* | 1/2007 | Gasquet | F21V 5/045 362/510 |
| 2007/0279926 A1* | 12/2007 | Geoffroy | B60Q 1/302 362/545 |
| 2007/0285937 A1 | 12/2007 | Walser et al. | |
| 2011/0317446 A1 | 12/2011 | Geoffroy et al. | |
| 2014/0085916 A1* | 3/2014 | Dubosc | G02B 27/2221 362/511 |
| 2015/0138790 A1* | 5/2015 | Salter | B60Q 3/54 362/510 |
| 2015/0199041 A1* | 7/2015 | Salter | G06F 3/042 345/174 |
| 2015/0247613 A1* | 9/2015 | Doha | G02B 6/0018 362/507 |
| 2015/0360607 A1 | 12/2015 | Czylok | |

FOREIGN PATENT DOCUMENTS

| | | |
|---|---|---|
| DE | 10 2007 053 186 A1 | 5/2009 |
| DE | 20 2013 101 038 U1 | 8/2013 |
| DE | 10 2015 114 861 A1 | 3/2016 |
| EP | 1 864 859 A1 | 12/2007 |

OTHER PUBLICATIONS

FR1752770, Isr.pdf, Mar. 2017, machine translation.*
French Preliminary Search Report dated Dec. 6, 2017 in French Application 17 52770 filed on Mar. 31, 2017 (with English Translation of Categories of Cited Documents).

* cited by examiner

INTERIOR LIGHTING MODULE FOR A MOTOR VEHICLE

TECHNICAL FIELD

The present invention relates to the field of the motor vehicle industry, and relates more particularly to the interior lighting modules for motor vehicles for lighting all or part of a motor vehicle interior.

STATE OF THE PRIOR ART

As is known, a motor vehicle interior is equipped with interior lighting modules in order to allow the users of said motor vehicle to light all or part of the interior, according to their needs. These lighting modules thus participate in the wellbeing of the users and make it possible to improve their comfort.

There are several types of lighting modules that make it possible to generate varied light beams in order to produce a number of light functions. For example, when a vehicle is stopped, it may be advantageous to uniformly light the interior in order to allow the users to easily see the interior of the motor vehicle. On the other hand in a driving situation for example, it may be desirable to not light a driving position of the motor vehicle while the other passengers might want a partial lighting according to their needs. Thus, a very pinpoint lighting, for which the spatial dispersion of the light beam is very small, may be sought in order to provide a light spot on a reduced surface: such is the case for example with the reading lights which make it possible to generate a very narrow light beam which allows a user to read without lighting the rest of the interior and without hampering the driver.

To satisfy these multiple lighting needs, it is known practice to incorporate in the dome light of the interior of the motor vehicle numerous light sources and/or several lighting modules each fulfilling a well defined light function. For example, a dome light is often equipped with at least one reading light for the passenger situated alongside the driver, as well as at least one lighting point for more globally lighting the interior.

One known drawback is linked to the bulk of the dome light: the multiplicity of the light sources and/or of the lighting modules, associated with the small spaces available in said dome light for the incorporation thereof, do not always make it possible to correctly satisfy the many interior lighting needs, or at the cost of expensive design.

The object of the present invention is to at least largely address the above problems and to also lead to other advantages by proposing a novel interior lighting module for a motor vehicle.

Another aim of the present invention is to facilitate the incorporation of such a lighting module in a motor vehicle interior dome light.

Another aim of the present invention is to reduce the manufacturing costs of such a lighting module.

Another aim of the present invention is to reduce the costs of incorporation of such a lighting module in the motor vehicle interior dome light.

SUMMARY OF THE INVENTION

According to a first aspect of the invention, at least one of the abovementioned objectives is achieved with an interior lighting module for a motor vehicle, said module comprising:

- at least two light sources arranged to be able to emit light rays;
- at least two optical guides, each optical guide having an optical axis which extends in a different direction from the optical axes of the other optical guides, each optical guide being associated with one of the light sources in order to format the light rays generated by said light source and generate a light beam;
- a single substrate for securing the at least two light sources, said substrate being planar.

The lighting module according to the invention thus comprises at least two light sources, each light source being associated with an optical guide that makes it possible to generate a particular light function. Thus, the lighting module according to the first aspect of the invention makes it possible to generate at least two different light functions. The result thereof is an easier incorporation in the interior of the motor vehicle, and even more particularly in the dome light. In effect, since the light sources are all situated on one and the same planar substrate, the substrate of the lighting module according to the first aspect of the invention is made to collaborate with the main substrate of the interior more simply: it is much simpler to establish the electrical connections between the lighting module and the interior.

Substrate should be understood to mean a support intended to receive the light sources and in particular to establish an electrical link between the light sources and an electrical circuit of the interior of the motor vehicle. Generally, the substrate comprises a material intended to receive the print of an electronic circuit, and/or different components that make up such an electronic circuit. As a nonlimiting example, the substrate can advantageously form an electronic circuit board, such as, for example, a printed circuit board or PCB. Complementing this, the substrate of the lighting module according to the first aspect of the invention also serves as mechanical reference to which the various elements of said lighting module are referenced—directly or indirectly—in order to allow them to collaborate together and generate the corresponding light beams.

Generally, the support of the lighting module according to the first aspect of the invention is intended to collaborate with the electrical circuit of the interior of the motor vehicle, and more particularly with the electrical circuit of a dome light of said interior. The substrate of the lighting module is distinct from the electrical circuit of the interior, in order to facilitate the electrical and mechanical incorporation of said lighting module in the interior.

According to the first aspect of the invention, the substrate is planar. More particularly, the substrate comprises at least one planar surface forming a plane of elongation of said substrate. Hereinafter in the description, the "planar" property of the substrate designates the at least one planar surface of said substrate. Advantageously, the planar surface of the substrate can be formed by a first face situated facing the optical guides of the lighting module. Alternatively, the planar surface of the substrate can be formed by a second face situated opposite the optical guides of the lighting module relative to said substrate. Generally, but in a nonlimiting manner, the first face and the second face of the substrate are at least partly parallel to one another, the substrate for example being able to form an electronic circuit board, as described previously.

Each light source associated with an optical guide makes it possible to generate a particular light function. Depending on the needs, each light source associated with its optical guide makes it possible to generate a light function different from all the others, or identical to at least a part of the light functions generated by the other light sources associated with their optical guides. The light function translates the destination of the corresponding light beam. As nonlimiting examples, the light functions can be: lighting the dome light of the interior diffusely, lighting the interior more uniformly, providing more pinpoint lighting of an ashtray, lighting at least a part of a dashboard of the motor vehicle, lighting at least a part of a central console of the interior, lighting at least one of the seats of the interior, etc.

The light function is thus linked to the particular light beam characteristics. Depending on the light functions sought, the following characteristics of the light beam can be adapted on their own or in combination: aperture angle, orientation, light intensity, color. One object of the invention according to its first aspect is thus to define a light module comprising at least two light sources each associated with an optical guide in order to generate at least two light beams having different characteristics in order to produce at least two different light functions.

Each optical guide is defined by an optical axis which extends according to a direction preferentially different from the optical axis of the other optical guides. The optical axis is defined here as an axis of symmetry or a median axis of the optical guide. By extension, the optical axis of the guide advantageously coincides with the optical axis of the light beam generated. "Median axis" for example defines a barycentric axis of the light rays having passed through one of the optical guides of the lighting module and thus forming one of the light beams. In other words, the median axis corresponds to the direction of majority propagation of the light beam concerned.

The lighting module according to the first aspect of the invention can advantageously comprise at least one of the refinements below, the technical features forming these refinements being able to be taken alone or in combination:
- at least a part of the optical guides is advantageously produced in a plastic material and/or in glass. Polycarbonate (PC), polypropylene carbonate (PPC) or polymethyl methacrylate (PMMA) will preferentially be used. Advantageously, the optical guides are obtained by molding;
- each optical guide is distinct from the other optical guides. In other words, each optical guide is delimited by walls which are distinct from the other walls delimiting the other optical guides;
- each light source is coupled optically to an end of one of the optical guides. This advantageous configuration makes it possible to inject at least a part of the light rays generated by the light source into the corresponding optical guide;
- each optical guide comprises a guiding section and a projection section. The guiding section makes it possible to route the light rays generated by the corresponding light source to the projection section in which they will be formatted in order to form the corresponding light beam. Inside the guiding section, the light rays are routed by internal reflections;
- the guiding section is situated between the projection section and the corresponding light source;
- according to a first variant embodiment, the guiding section is rectilinear. Thus, the guiding section extends protrudingly from the substrate of the lighting module. The guiding section can extend at right angles relative to the substrate and/or at an angle. According to a particular embodiment, the guiding section of each optical guide extends parallel. Possibly, the guiding sections of optical guides extend in different directions. Advantageously, the guiding section of at least a part of the optical guides extends vertically from the substrate. According to a second variant embodiment, the guiding section comprises at least one bent part in order to take account of the constraints of incorporation of the lighting module in the interior of the motor vehicle in which it is intended to be incorporated. The bent parts of the optical guides can obviously be oriented in similar or different directions, in order to define a similar or respectively different orientation of the optical axes of each projection section, thus making it possible to orient the light beams generated in directions and according to orientations that are different;
- the projection section is parabolic or hyperbolic, an aperture angle of the projection section making it possible to define an aperture angle of the corresponding light beam;
- advantageously, the guiding section and the projection section are made of a single piece. Alternatively, the guiding section and the projection section can be added and coupled optically to one another;
- the at least two optical guides comprise a first optical guide for generating a first light beam according to a first aperture angle and according to a first optical axis, and a second optical guide for generating a second light beam according to a second aperture angle and according to a second optical axis;
- the first aperture angle is smaller than the second aperture angle. This advantageous configuration thus makes it possible to generate a first light beam whose spatial extent is narrower than the spatial extent of the second light beam, each light beam thus producing a different light function;
- the first light beam at least partly overlaps the second light beam. This advantageous configuration makes it possible to make at least a part of the light rays generated by the first light source intersect with at least a part of the light rays generated by the second light source. To do this, the orientation of the optical axis of each optical guide and/or the aperture angle of each optical guide is configured so as to be oriented substantially toward the other optical guide;
- according to a first alternative, the lighting module according to the first aspect of the invention comprises at least one optical window situated at a distal end of the optical guides relative to the substrate. This advantageous configuration makes it possible to protect the distal ends of each optical guide using at least one corresponding optical window. According to a first variant, the distal end of each optical guide is closed by a distinct optical window; according to a second variant, one optical window covers the distal ends of several optical guides. The at least one optical window is advantageously produced in a transparent material, such as, for example, a plastic material and/or glass. Polycarbonate (PC), polypropylene carbonate (PPC) or polymethyl methacrylate (PMMA) will preferentially be used. Advantageously, the at least one optical window is made of a single piece with the optical guides. Alternatively, the at least one optical window is added and fixed securely to at least a part of the optical guides;
- according to a second alternative, the lighting module according to the first aspect of the invention comprises a single optical window situated at a distal end of the optical guides relative to the substrate, said optical window covering the first and the second optical guides. This advantageous configuration makes it possible to protect the distal ends of each optical guide using the optical window. The optical window is advantageously produced in a transparent material, such as, for example, a plastic material and/or glass. Polycarbonate (PC), polypropylene carbonate (PPC) or polymethyl methacrylate (PMMA) will preferentially be used. Advantageously, the optical window is made of a single piece with the optical guides. Alternatively, the optical window is added and fixed securely to the optical guides;

generally, the lighting module comprises an optical window situated at a distal end of the at least two optical guides relative to the substrate, said optical window covering at least the two optical guides;

the optical window is parallel to the substrate; alternatively, the optical window extends according to a plane secant with a plane of elongation of the substrate. The plane as described previously, the plane of elongation of the substrate, corresponds to the planar surface of the substrate, said planar surface being able to be formed by the face of the substrate facing the optical guides or the face opposite the optical guides relative to the substrate. The optical window can be planar or curved in order to be adapted to the geometry of the interior of the motor vehicle with which the lighting module is intended to collaborate;

the light sources can advantageously be driven selectively or collectively. Advantageously, each light source is of the type of a light-emitting diode. As a nonlimiting example, the light sources can be:

of the diode with axial emission type, making it possible to generate light rays in a main direction substantially at right angles to the plane of the support supporting them; and/or of the diode with lateral emission type, making it possible to generate light rays in a direction parallel to the plane of the support supporting them; and/or of the diode with through emission type, making it possible to generate light rays through the support supporting them.

According to a second aspect of the invention, a motor vehicle interior is proposed, said interior comprising at least one interior lighting module according to the first aspect of the invention or according to any one of the refinements thereof, said lighting module being incorporated in a dome light of said interior.

The compact configuration of the lighting module thus makes it possible to facilitate the incorporation thereof in the dome light of the interior. In particular, the feature whereby all the light sources are situated on one and the same planar support makes it possible to facilitate the establishing of the electrical connections with the electrical circuit of the dome light.

The interior according to the second aspect of the invention can advantageously comprise at least one of the refinements below, the technical features forming these refinements being able to be taken alone or in combination:

the first optical axis of the first optical guide of the module is oriented at the level of a seat of said interior, and the second optical axis of the second optical guide is oriented toward a central console of said interior;

the first optical guide is arranged to generate a first light beam with an aperture angle smaller than an aperture angle of a second light beam generated by the second optical guide;

the lighting module is arranged on a central part of the dome light of the interior. Alternatively, the lighting module is arranged on one side of the dome light of the interior. According to an advantageous embodiment, the interior comprises a first and a second interior lighting module, the first lighting module being situated on a first side of the interior of the motor vehicle and the second lighting module being situated on a second side of the interior, preferably symmetrically relative to a median axis of said interior. The median axis is preferentially an axis which extends from the rear of the motor vehicle to the front;

the substrate of each module is coupled electrically and/or mechanically to an electrical circuit of the dome light and integral to said electrical circuit, for example by soldering and/or by independent mechanical coupling of fixing screw type or by engagement of complementary forms with the electrical circuit for example.

According to a third aspect of the invention, a motor vehicle is proposed comprising an interior according to the second aspect of the invention or according to any one of the refinements thereof.

Varied embodiments of the invention are provided, incorporating, according to all of their possible combinations, the different optional features explained herein.

DESCRIPTION OF THE FIGURES

Other features and advantages of the invention will become more apparent through the following description on the one hand, and through several exemplary embodiments given by way of indication and in a nonlimiting manner with reference to the attached schematic drawings on the other hand, in which.

Obviously, the features, the variants and the different embodiments of the invention can be associated with one another, according to various combinations, in as much as they are not mutually incompatible or exclusive. It will in particular be possible to devise variants of the invention comprising only a selection of features described hereinbelow in isolation from the other features described, if this selection of features is sufficient to confer a technical advantage or to differentiate the invention from the prior art.

In particular, all the variants and all the embodiments described can be combined with one another provided there is nothing technically opposing such combination.

In the figures, the elements that are common to several figures retain the same reference.

DETAILED DESCRIPTION OF THE INVENTION

Figure 1:
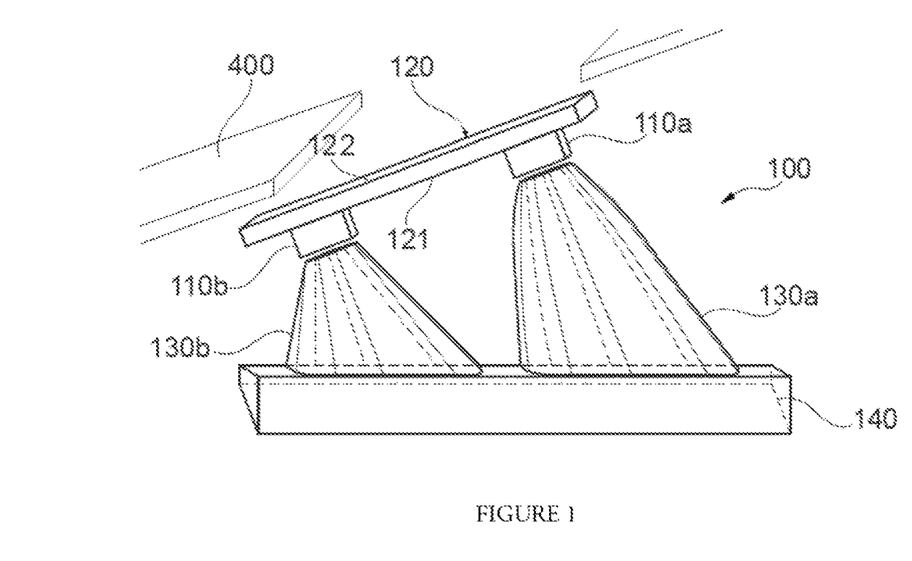
FIG. 1 illustrates a first exemplary embodiment of a lighting module according to the first aspect of the invention.
Figure 2:
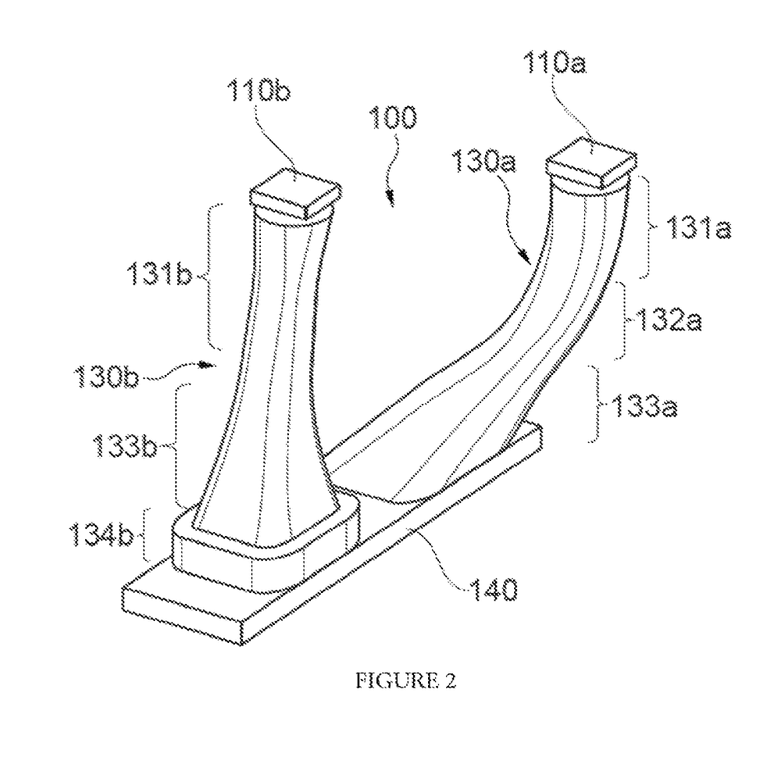
FIG. 2 illustrates a second exemplary embodiment of a lighting module according to the first aspect of the invention.

Referring to FIGS. 1 and 2, an interior lighting module 100 for a motor vehicle comprises:

two light sources 110a, 110b arranged to emit light rays when they are polarized selectively or collectively by a control module that is not represented. As described previously, the lighting module 100 can possibly comprise more than two light sources 110a, 110b;

two optical guides 130a, 130b, each optical guide 130a, 130b being associated with one of the light sources 110a, 110b in order to format the light rays generated by said light source 110a, 110b and generate a light beam according to one of the light functions described previously. Furthermore, each optical guide 130a, 130b extends according to an optical axis oriented in a different direction from that of the other optical guides 130a, 130b;

a single substrate 120 for securing the light sources 110a, 110b, said substrate 120 being planar in order to facilitate the incorporation of the lighting module 100 in the interior of the motor vehicle. In the example illustrated in FIG. 1, the substrate 120 is of rectangular form and extends on either side of the light sources 110a, 110b. Obviously, the substrate 120 can take any form in order to satisfy the requirements of bulk in the interior, and more particularly in the dome light in which the lighting module 100 is intended to be mounted. The substrate 120 is delimited by a first planar surface 121 situated facing the optical guides 130a, 130b of the lighting module 100 and a second planar surface 122 situated opposite the optical guides of said lighting module 100 relative to the first planar surface 121. According to the invention, the substrate 120 of the lighting module 100 is intended to collaborate with an electrical circuit 400 of the interior of the motor vehicle, and more particularly the dome light. This collaboration is produced by an electrical communication of a part of the electrical tracks of the electrical circuit 400 of the interior with the substrate 120 and/or by a mechanical coupling between the substrate 120 and the electrical circuit 400 of said interior.

Each light source 110a, 110b is coupled optically to an end of the optical guide 130a, 130b with which it collaborates. In order to facilitate the optical coupling of the light source 110a, 110b with the optical guide 130a, 130b, the light source 110a, 110b is advantageously fixed against a face facing the optical guide 130a, 130b situated at the level of the end of the optical guide 130a, 130b situated on the side of the substrate 120. Alternatively, the optical coupling of at least a part of the light sources 110a, 110b can be improved by the use of an optical device making it possible to orientate the light rays generated by the light source 110a, 110b in the optical guide 130a, 130b, such as a collimator for example.

The light sources 110a, 110b can be of any type; preferentially, the light sources 110a, 110b are of the type of at least one light-emitting diode emitting light rays of which at least a part has a wavelength lying between 300 nm and 800 nm.

Each light source 110a, 110b is coupled electrically with the substrate 120 in order to be able to be polarized in order to generate the corresponding light rays. The electrical coupling of the light sources 110a, 110b with the substrate 120 can be produced for example by soldering.

The substrate preferentially comprises an electronic circuit board and/or a printed circuit board making it possible to control each light source 110a, 110b selectively or collectively. The driving of the light sources 110a, 110b and/or of the lighting module 100 is assured by a control module that is not represented.

Each optical guide 130a, 130b is arranged to format the light rays generated by the light source 110a, 110b to which it is coupled, so as to form a light beam conformed in order to produce a predetermined light function. The light beam—and therefore the corresponding light function—are determined in particular by the type of light source 110a, 110b used, and/or a light power generated by said light source 110a, 110b, and/or a wavelength of the light rays generated, and/or a light beam form and/or an orientation of the light beam and/or an aperture angle of said light beam.

The optical guides 130a, 130b are produced in a transparent material for the wavelengths of the light rays emitted by the light sources 110a, 110b, such as, for example, glass or a plastic material. Advantageously, each optical guide 130a, 130b is produced by molding. Possibly, all the optical guides 130a, 130b of the lighting module 100 are made of a single piece, for example as a result of a single molding process. Alternatively, each optical guide 130a, 130b can form a piece that is independent of the other optical guides 130a, 130b.

In the example illustrated in FIG. 1, each optical guide 130a, 130b comprises an axis of symmetry forming an optical axis of the optical guide 130a, 130b and of the formatted light beam. The optical axis of each optical guide 130a, 130b is advantageously at right angles to the substrate 120. The optical guides 130a, 130b are thus at least partly situated perpendicular to the substrate 120. Each optical guide 130a, 130b is of parabolic or hyperbolic form. Each optical guide 130a, 130b is delimited laterally by walls of parabolic or hyperbolic form in order to format the light rays which can be propagated inside the optical guide 130a, 130b, for example by internal reflections. Possibly, one or more internal faces of the optical guides 130a, 130b are metalized in order to facilitate the reflections of the light rays on the walls of said optical guides 130a, 130b.

In the example illustrated in FIG. 1, the optical guides 130a, 130b do not have the same form in order to generate light beams of different form—thus making it possible to produce different light functions. In particular, an aperture angle of the first optical guide 130a associated with the first light source 110a is smaller than an aperture angle of the second optical guide 130b associated with the second light source 110b. Consecutively, the light beam generated by the first light source 110a collaborating with the first optical guide 130a has an angular aperture smaller than that of the light beam generated by the second light source 110b collaborating with the second optical guide 130b.

The angular aperture of the optical guide 130a, 130b or of the light beam formed thereby translates an angular distance between the most divergent light rays of said light beam emerging from said optical guide 130a, 130b. More particularly, the angular aperture is defined by the angle subtended by the optical axis of said optical guide 130a, 130b (or the corresponding light beam) and:

for the optical guide 130a, 130b, the lateral wall delimiting said optical guide 130a, 130b; or for the light beam, the most divergent light ray.

In the example illustrated in FIG. 2, the optical guides 130a, 130b do not have the same form in order to generate light beams of different form—thus making it possible to produce different light functions.

Each optical guide 130a, 130b comprises a projection section 133a, 133b in order to format the light rays passing through the optical guide 130a, 130b and a guiding section 131a, 131b in order to guide the light rays emitted by the corresponding light source 110a, 110b to said projection section 133.

The guiding section 131a, 131b, is, at its end situated facing the corresponding light source 110a, 110b, coupled optically to said light source 110a, 110b in order for at least a part of the light rays generated by said light source 110a, 110b to be injected into the optical guide 130a, 130b. The optical coupling can be direct or indirect, via an optical device such as a collimator for example.

For the first optical guide 130a associated with the first light source 110a, the guiding section 131a-132a comprises a rectilinear first part 131a and a bent second part 132a. Its section is overall constant. Its section is advantageously circular but can take any other form, notably polygonal.

The first part 131a of the guiding section 131a-132a of the first optical guide 130a extends in a direction substantially at right angles to the plane of the substrate 120 and/or of the first light source 110a as represented in FIG. 2. The first part 131a of the guiding section 131a-132a thus extends vertically to the first light source 110a and/or the substrate 120.

The bent second part 132a of the guiding section 131a-132a has a section preferentially identical to that of the rectilinear first part 131a of said guiding section 131a-132a. The surface area of the section of the bent second part 132a of the guiding section 131a-132a is preferentially equal to that of the rectilinear first part 131a. The form of the section of the bent second part 132a of the guiding section 131a-132a is preferentially of the same type as that of the rectilinear first part 131a.

The bent second part 132a of the guiding section 131a is prolonged by the projection section 133a with a continuity of the forms of the walls and/or of the section. The projection section 133a has a divergent section in a direction moving away from the guiding section 131a: a surface area of the projection section 133a is greater than a surface area of the guiding section 131a at a distal end of the projection section 133a relative to the guiding section 131a. Furthermore, the form of the section of the first optical guide 130a evolves continually between the guiding section 131a and the projection section 133a: on the side of the end of the guiding section 131a situated toward the first light source 110a, the section of said guiding section 131a is circular, whereas, on the side of a distal end of the projection section 133a relative to the guiding section 131a, the section of said projection section 133a is polygonal, and more particularly rectangular with rounded corners. Between these two ends, the section of the first optical guide 130a evolves by continuous morphological transformation.

For the second optical guide 130b associated with the second light source 110b, the guiding section 131b is rectilinear. Its section is overall constant. Its section is advantageously circular but can take any other form, notably polygonal. The guiding section 131b extends in a direction substantially at right angles to the plane of the substrate 120 and/or of the second light source 110b as represented in FIG. 2. The guiding section 131b thus extends vertically to the second light source 110b and/or the substrate 120.

The guiding section 131b is prolonged by the projection section 133b with a continuity of the forms of the walls and/or of the section. The projection section 133b has a divergent section in a direction moving away from the guiding section 131b; a surface area of the projection section 133b is greater than a surface area of the guiding section 131b at a distal end of the projection section 133b relative to the guiding section 131b. Complementing this, the form of the section of the second optical guide 130b evolves continually between the guiding section 131b and the projection section 133b: on the side of the end of the guiding section 131b situated toward the second light source 110b, the section of said guiding section 131b is circular, whereas, on the side of a distal end of the projection section 133b relative to the guiding section 131b, the section of said projection section 133b is polygonal, and more particularly rectangular with rounded corners. Between these two ends, the section of the second optical guide 130b evolves by continuous morphological transformation.

The projection section 133b of the second optical guide 130b extends in the same direction as the guiding section 131b. In other words, the projection section extends substantially at right angles to the substrate 120 and/or to the plane of the second light source 110b represented in FIG. 2. Advantageously, the projection section 133b extends vertically to the substrate 120 and/or the second light source 110b.

At the distal end of the projection section 133b relative to the guiding section 131b, the second optical guide 133b comprises a border 134b forming a platform surrounding the projection section 133b.

In each exemplary embodiment illustrated in FIGS. 1 and 2, at the distal end of the optical guides 130a, 130b relative to the substrate 120, the lighting module 100 advantageously comprises an optical window 140 making it possible to block said optical guides 130a, 130b while allowing the transmission of the light beam or beams generated by said lighting module 100. According to a particular embodiment, the optical window 140 is made of a single piece with at least one of the optical guides 130a, 130b, and preferentially with all the optical guides 130a, 130b, such that the assembly formed by the optical guides 130a, 130b and the optical window 140 forms a single single-piece part.

The optical window 140 is formed at least partly by a material transparent to the wavelengths of the light rays generated by the light sources 110a, 110b, such as, for example, glass or a plastic material.

Figure 3:
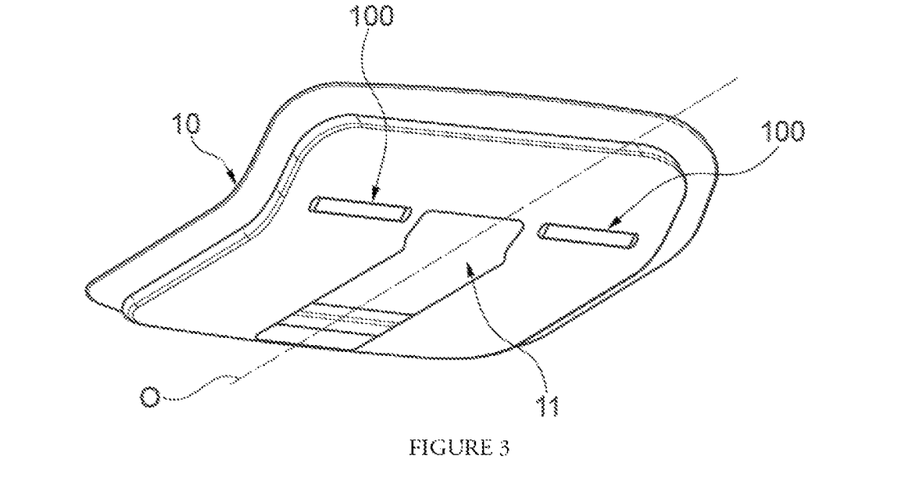
FIG. 3 illustrates a partial view of an interior dome light incorporating two lighting modules according to the first aspect of the invention.
Figure 4:
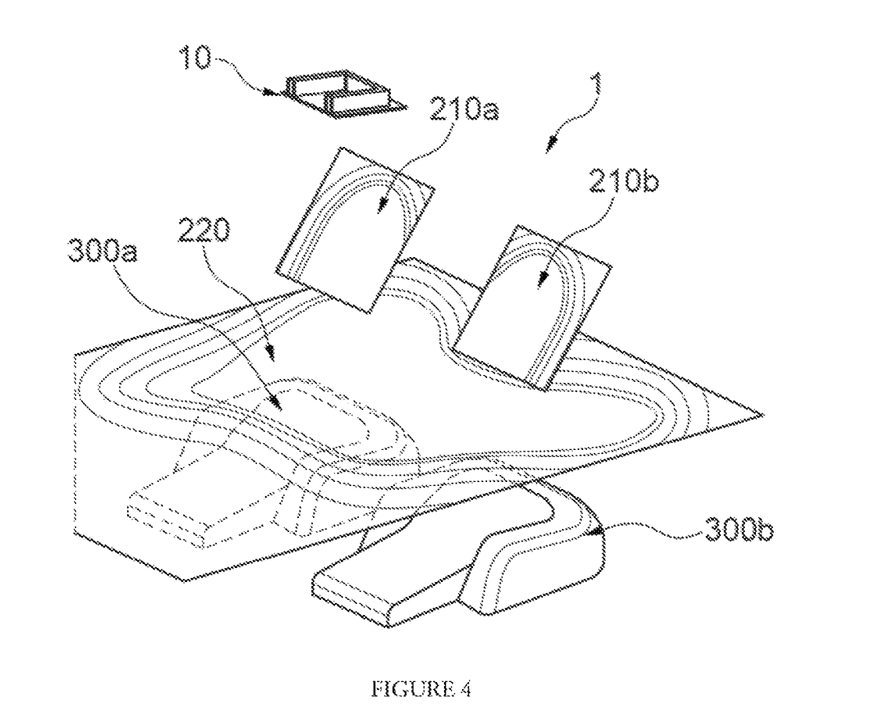
FIG. 4 illustrates a partial view of a motor vehicle interior according to the second aspect of the invention.

FIG. 3 illustrates a partial view of a dome light 10 of an interior 1 incorporating two lighting modules 100 according to the first aspect of the invention, and FIG. 4 illustrates a partial view of an interior 1 of a motor vehicle according to the second aspect of the invention, in which the different light beams generated by the lighting modules 100 are represented.

Advantageously, each lighting module 100 according to the first aspect of the invention is housed in a dome light 10 in order to allow a part of the interior 1 to be lit effectively for at least one of the users of the motor vehicle.

Preferentially, each light module 100 is housed on a lateral side of the dome light 10, that is to say on either side of a longitudinal axis O of the dome light 10, coinciding with a longitudinal axis of the motor vehicle incorporating such a dome light 10. More particularly, each lighting module 100 is situated symmetrically relative to the longitudinal axis O. Each lighting module 100 can be situated in proximity to a glazed opening 11 of the dome light 10.

The lighting module or modules 100 according to the first aspect of the invention are advantageously situated on a front-end part of the dome light 10 of the interior 1 of the motor vehicle. More particularly, the lighting module or modules are situated at the level of the front seats 300a, 300b of the interior 1, for example vertical to a seat or to a backrest of the front seats 300a, 300b of the interior 1.

FIG. 4 illustrates the light intensities of the light beams projected by the lighting modules 100 housed in the dome light 10. In particular:

a first lighting module 100 can generate a first light beam 210a and/or a complementary light beam collaborating with said first beam to form—at least partly—a second light beam 220;

a second lighting module 100 can generate a first light beam 210b and/or a complementary light beam collaborating with said first beam to form—at least partly—the second light beam 220.

It is thus understood that each lighting module 100 can alternately or complementarily generate a first type of light beam when only the first light source 110a is activated—producing the first light beam 210, a second type of light beam when only the second light source 110b is activated—producing the complementary light beam, or a third type of light beam when the first 110a and second 110b light sources are simultaneously activated—producing at least partly the second light beam 220.

Each first light beam 210a, 210b generated by the lighting modules 100 produces a first light function of reading light type: the spatial extent of the light rays formatted by the first optical guide 130a of each lighting module 100 is located in a zone of small spatial extent, facing a surface area of the interior 1. This technical feature of each first light beam 210a, 210b is obtained by a small aperture angle of the corresponding first optical guide 130a, 130b.

Furthermore, the projection plane of each first light beam 210a, 210b is inclined relative to a horizontal plane of the interior 1, not represented in FIG. 4. The horizontal plane of the interior 1 corresponds to the horizontal plane of normal use of the motor vehicle comprising said interior 1. The inclination of the projection plane of each first light beam 210a is preferentially equal to 45° relative to the horizontal plane. Possibly, the inclination of the projection plane of each first light beam 210a lies between 30° and 60° relative to the horizontal plane. This technical feature of each first light beam 210a, 210b is obtained by a similar inclination of the optical axis of the corresponding first optical guide 130a of the lighting module 100. More particularly, the first optical guide 130a is oriented according to an optical axis for which an angle relative to the horizontal plane lies between 30° and 60°, preferentially equal to 45°.

As a result, each first light beam generated by the lighting module(s) 100 has technical features which make it suitable for focusing the light rays produced by corresponding light sources 110a, 110b in a localized zone of the interior 1, likely to allow one of the users of said motor vehicle to read.

The second light source 110b of each lighting module 100 can be driven so as to generate light rays, complementing or alternatively to the emission of light rays by the first light source 110a of each lighting module 100. Preferentially, the second light source 110b of at least one of the lighting modules 100 of the interior 1 is activated simultaneously with the first light source 110a of the corresponding lighting module 100. The simultaneous activation of the first light source 110a and of the second light source 110b of at least one lighting module 100 makes it possible to at least partly generate the second light beam 220.

The complementary light beam generated by the second light source 110b of each lighting module 100 extends over a more extensive surface than that of the first light beam 210. This technical feature is obtained by an aperture angle of the second optical guide 130b greater than that of the first optical guide 130a.

Furthermore, the projection plane of each complementary light beam lies substantially in the horizontal plane of the interior 1. This technical feature is obtained by a similar inclination of the optical axis of the corresponding second optical guide 130b of the corresponding lighting module 100. More particularly, the second optical guide 130b is oriented according to an optical axis that is substantially at right angles relative to the horizontal plane.

According to a particular embodiment, for each lighting module 100, the first light beam 210 and the complementary light beam overlap at least partially in order to increase the lighting surface in the interior 1 and produce an ambient lighting of said interior 1.

According to a preferred embodiment, the first light beam 210a and/or the complementary light beam of the first lighting module 100 at least partially overlap the first light beam 210a and/or the complementary light beam of the second lighting module 100, according to any one of the combinations. This advantageous configuration is illustrated more particularly in FIG. 4, through the second light beam 220 whose spatial distribution covers almost all the surface of the interior 1 situated in front of the front seats 300a, 300b.

Quite obviously, each light source 110a, 110b of each lighting module 100, and/or each lighting module 100 of the interior 1 can be driven selectively or collectively in order to generate at least one of the first light beams and/or at least one of the complementary light beams, in order to produce at least two different light functions out of those described previously.

To sum up, the invention relates to an interior lighting module 100 for a motor vehicle interior 1, said lighting module 100 comprising at least two light sources 110a, 110h, each light source 110a, 110b being associated with an optical guide 130a, 130b in order to make at least two distinct light beams. The lighting module 100 thus makes it possible to produce at least two light functions, preferably distinct from one another. According to the invention, the light sources 110a, 110b of the lighting module 100 are secured to one and the same planar substrate 120 in order to facilitate the incorporation thereof in the interior 1 of the motor vehicle and to facilitate the establishing of the electrical connections with the electrical circuit of said interior 1.

Of course, the invention is not limited to the examples which have just been described and numerous developments can be added to these examples without departing from the scope of the invention. In particular, the different features, forms, variants and embodiments of the invention can be associated with one another according to various combinations in as much as they are not mutually incompatible or exclusive. In particular, all the variants and embodiments described previously can be combined with one another.

The invention claimed is:

1. An interior lighting module for a motor vehicle, the interior lighting module comprising:

at least two light sources arranged to emit light rays;

at least two optical guides, each optical guide having an optical axis which extends in a different direction from the optical axes of the other of the at least two optical guides, each optical guide being associated with one of the at least two light sources in order to format the light rays generated by the one of the at least two light sources and generate a light beam; and a single substrate for securing the at least two light sources, wherein the substrate is planar, and each of the at least two optical guides is delimited laterally on all sides by walls, the walls being between an entrance surface through which light from the associated light source enters the optical guide and an exit surface through which substantially the entirety of the light propagating inside the optical guide exits the optical guide, the exit surface being at the distal end of the optical guide along a longitudinal axis of the optical guide and opposite to the entrance face, in order to format the light rays which propagate inside each of the at least two optical guides by internal reflections.

2. The interior lighting module according to claim 1, wherein each light source is coupled optically to an end of one of the at least two optical guides.

3. The interior lighting module according to claim 1, wherein each optical guide comprises a guiding section and a projection section.

4. The interior lighting module according to claim 3, wherein the guiding section is situated between the projection section and the corresponding light source.

5. The interior lighting module according to claim 3, wherein the guiding section is rectilinear.

6. The interior lighting module according to claim 3, wherein the guiding section comprises at least one bent part.

7. The interior lighting module according to claim 3, wherein the projection section is parabolic or hyperbolic.

8. The interior lighting module according to claim 1, wherein the at least two optical guides comprise a first optical guide for generating a first light beam according to a first aperture angle and according to a first optical axis, and a second optical guide for generating a second light beam according to a second aperture angle and according to a second optical axis.

9. The interior lighting module according to claim 8, wherein the first aperture angle is smaller than the second aperture angle.

10. The interior lighting module according to claim 8, wherein the first light beam at least partly overlaps the second light beam.

11. The interior lighting module according to claim 1, further comprising an optical window situated at a distal end of the at least two optical guides relative to the substrate, the optical window covering at least the two optical guides.

12. The interior lighting module according to claim 11, wherein the optical window extends according to a plane secant with a plane of elongation of the substrate.

13. A motor vehicle interior comprising at least one interior lighting module according to claim 1, wherein each lighting module is incorporated in a dome light of the motor vehicle interior.

14. The motor vehicle interior according to claim 13, wherein the at least two optical guides comprise a first optical guide and a second optical guide, a first optical axis of the first optical guide of the interior lighting module is oriented at the level of a seat of the motor vehicle interior, and the second optical axis of the second optical guide is oriented toward a central console of the motor vehicle interior.

15. The motor vehicle interior according to claim 13, wherein the at least two optical guides comprise a first optical guide and a second optical guide, a first optical guide is arranged to generate a first light beam with an aperture angle smaller than an aperture angle of a second light beam generated by the second optical guide.

16. The motor vehicle interior according to claim 13, wherein the substrate of each interior lighting module is coupled electrically to an electrical circuit of the dome light and integral to the electrical circuit.

17. The interior lighting module according to claim 2, wherein each optical guide comprises a guiding section and a projection section.

18. The interior lighting module according to claim 4, wherein the guiding section is rectilinear.

19. The interior lighting module according to claim 4, wherein the guiding section comprises at least one bent part.

20. The interior lighting module according to claim 4, wherein the projection section is parabolic or hyperbolic.

* * * * *